United States Patent [19]
Ma

[11] Patent Number: 6,067,280
[45] Date of Patent: May 23, 2000

[54] TRACK ZERO CROSS SIGNAL GENERATION APPARATUS FOR OPTICAL DISK SYSTEM

[75] Inventor: Byung-In Ma, Suwon, Rep. of Korea

[73] Assignee: Samsung Electronics Co., Ltd., Suwon, Rep. of Korea

[21] Appl. No.: 08/969,339

[22] Filed: Nov. 28, 1997

[30] Foreign Application Priority Data

Nov. 28, 1996 [KR] Rep. of Korea ..................... 96-59197

[51] Int. Cl.⁷ ..................................................... G11B 7/00
[52] U.S. Cl. ..................................... 369/44.28; 369/44.25
[58] Field of Search ................................. 369/32, 44.25, 369/44.27, 44.28, 44.29, 44.35, 47, 48, 54, 58, 124

[56] References Cited

U.S. PATENT DOCUMENTS 5,499,223  3/1996  Yanagi et al. ........................ 369/44.28
5,682,307  10/1997  Sasaki et al. ........................ 369/44.28

*Primary Examiner*—Paul W. Huber
*Attorney, Agent, or Firm*—Staas & Halsey LLP

[57] ABSTRACT

A track zero cross signal generation apparatus for use in an optical disk system receives a tracking error signal acquired when traversing tracks on a recording medium and generates a track zero cross signal. The track zero cross signal generation apparatus includes a booster which receives the tracking error signal, low-pass-filters the received tracking error signal, and amplifies the low-pass-filtered tracking error signal having a predetermined high frequency band in a pass band for low-pass-filtering. The booster outputs the low-pass-filtered tracking error signal whose signal level in a predetermined high frequency band is amplified, to a comparator. The comparator receives the output of the booster, compares the received signal with predetermined reference voltage levels, and generates a track zero cross signal having different pulse levels when the voltage level of the received signal is larger than a predetermined first reference voltage level or when the voltage level of the received signal is smaller than a predetermined second reference voltage level. Also, the apparatus further includes a center level corrector which corrects the center level of the signal output from the booster into a zero level involved with the predetermined reference voltage levels and outputs the corrected result. The track zero cross signal generation apparatus prevents missing of the track zero cross signal in a predetermined high frequency band when an optical pickup traverses tracks on the recording medium, to thereby enable an optical pickup to accurately and quickly gain access to a target track.

9 Claims, 3 Drawing Sheets

TRACK ZERO CROSS SIGNAL GENERATION APPARATUS FOR OPTICAL DISK SYSTEM

BACKGROUND OF THE INVENTION

1. Field of the Invention

The present invention relates to a track zero cross signal generation apparatus for use in an optical disk system, and more particularly, to an apparatus for generating an accurate track zero cross signal, by correcting a tracking error signal acquired when an optical pickup traverses tracks on a recording medium.

2. Description of the Related Art

In a general optical disk system for recording and reproducing data, a tracking error signal (TES) is used as a tracking servo signal for an optical pickup device in order to accurately focus a beam spot on the center of a track. The optical disk system performs a seek servo control to cross tracks for high-speed seek when a target track is far from a current track. In this case, an optical pickup in the optical disk system traverses the tracks in the radial direction on an optical disk such as a compact disk (CD) or a digital versatile disk (DVD). At the same time, a photodetector in the optical disk system detects light reflected from the recording surface of the optical disk to thereby generate a tracking error signal. The tracking error signal is input to a comparator which functions as a track zero cross signal generation apparatus. The comparator compares the input tracking error signal with predetermined reference voltage levels, and generates a track zero cross signal (TZCS) based on the comparison result. A seek servo apparatus counts the number of rising edges or falling edges of the generated track zero cross signal, calculates the number of the traversed tracks, and moves an optical pickup from a current track to a target track based on the calculated number of the traversed tracks.

Meanwhile, it is more critical in case of a DVD to access to a target track at a high speed, than in a CD. Thus, in the case of a DVD system, a track zero cross signal should be accurately made from a tracking error signal obtained when traversing tracks at high speed. By the way, a track zero cross signal may be improperly generated from a faulty tracking error signal with noise in its high frequency band. Therefore, a general optical disk system performs low-pass filtering of the above-described tracking error signal in order to remove the noise. However, such a low-pass-filtered tracking error signal may cause a phenomenon where an envelope of a predetermined high-frequency band in a pass band becomes smaller. Also, when an optical pickup device works at a high speed, the optical axis of an object lens tends to be aligned differently from arrangement of the optical axis when the optical pickup device operates at a normal speed. Accordingly, the reflected light passing through the center of the object lens after being reflected from the optical disk may be detected in a position departed from the center of the photodetector. For this reason, the center level of the tracking error signal obtained from the optical disk differs from the zero level which is the detection center level of the photodetector.

FIG. 1 is a graphical state diagram showing a phenomenon where a tracking error signal obtained when an optical pickup traverses tracks on a recording medium at a high speed is distorted. In FIG. 1, an X-axis represents time and a Y-axis represents a voltage level. A reference character E represents an envelop of a tracking error signal. HF represents a relatively high-frequency tracking error signal. LF represents a low-frequency tracking error signal. Z represents a zero level of a photodetector. C represents the center level of the reflected light passing through an object lens, which depicts that the reflected light detected by the photodetector is off from the zero level by a level of $-\Delta V$. In the case of the tracking error signal of FIG. 1, an envelop of a relatively high-frequency band is smaller than that of a low-frequency band, and the center level of a tracking error signal is off the zero level. The tracking error signal is generated mainly due to a low-pass filtering and an off-axis of the object lens. In addition to the above main causes, the tracking error signal as shown in FIG. 1 may always be generated since various external disturbances occur due to a high-speed operation of the optical pickup device and a high-speed rotation of the optical disk.

A conventional track zero cross signal generation apparatus receives a tracking error signal described with reference to FIG. 1 and generates a track zero cross signal. In more detail, the tracking error signal obtained from the optical disk is input to a comparator during seek servo control. The comparator compares the input signal voltage with predetermined reference voltage levels, and then generates a track zero cross signal having mutually different pulse levels whenever a voltage level of the input signal is larger than a first reference voltage level or whenever a voltage level of the input signal is smaller than a second reference voltage level. Here, the comparator accurately generates a track zero cross signal having different pulse levels only when the center level of the tracking error signal input to the comparator coincides with the zero level relating to the predetermined reference voltage levels, and the envelop is larger than the first reference voltage level or smaller than the second reference voltage level. Thus, when the tracking error signal input to the comparator is distorted as in the FIG. 1 tracking error signal irrespective of whether low-pass filtering is performed, the comparator misses the track zero cross signal at a predetermined high-frequency band. Accordingly, a conventional optical disk system which fails to generate a track zero cross signal accurately cannot access a target track accurately and quickly.

SUMMARY OF THE INVENTION

To solve the above problem, it is an object of the present invention to provide a track zero cross signal generation apparatus for generating an accurate track zero cross signal by correcting a tracking error signal acquired when an optical pickup traverses tracks on a recording medium.

Additional objects and advantages of the invention will be set forth in part in the description which follows and, in part, will be obvious from the description, or may be learned by practice of the invention.

To accomplish the above and other objects of the present invention, there is provided a track zero cross signal generation apparatus for generating a track zero cross signal from a tracking error signal acquired when traversing tracks on a recording medium for use in an optical disk system, the track zero cross signal generation apparatus including boosting means for receiving the tracking error signal, low-pass-filtering the received tracking error signal, and amplifying the low-pass-filtered tracking error signal having a predetermined high-frequency band in the pass band for low-pass-filtering; and a comparator for receiving the output of the boosting means, comparing the received signal with predetermined reference voltage levels, and generating a track zero cross signal based on the comparison result. Also, the apparatus according to the present invention further comprises center level correction means for correcting the center level of the signal output from the boosting means into a zero level involved with the predetermined reference voltage levels and outputting the corrected result to the comparator.

According to another aspect of the present invention, there is provided a track zero cross signal generation apparatus for generating a track zero cross signal from a tracking error signal acquired when traversing tracks on a recording medium for use in an optical disk system, the track zero cross signal generation apparatus including center level correction means for receiving the tracking error signal, correcting the center level of the received tracking error signal into a zero level involved with predetermined reference voltage levels and outputting the corrected result; and a comparator for receiving the output of the center level correction means, comparing the received signal with the predetermined reference voltage levels, and generating a track zero cross signal based on the comparison result. Also, the apparatus according to the present invention further comprises boosting means for receiving the signal output from the center level correction means, low-pass-filtering the received signal, and amplifying the low-pass-filtered tracking error signal having a predetermined high-frequency band in the pass band for low-pass-filtering.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
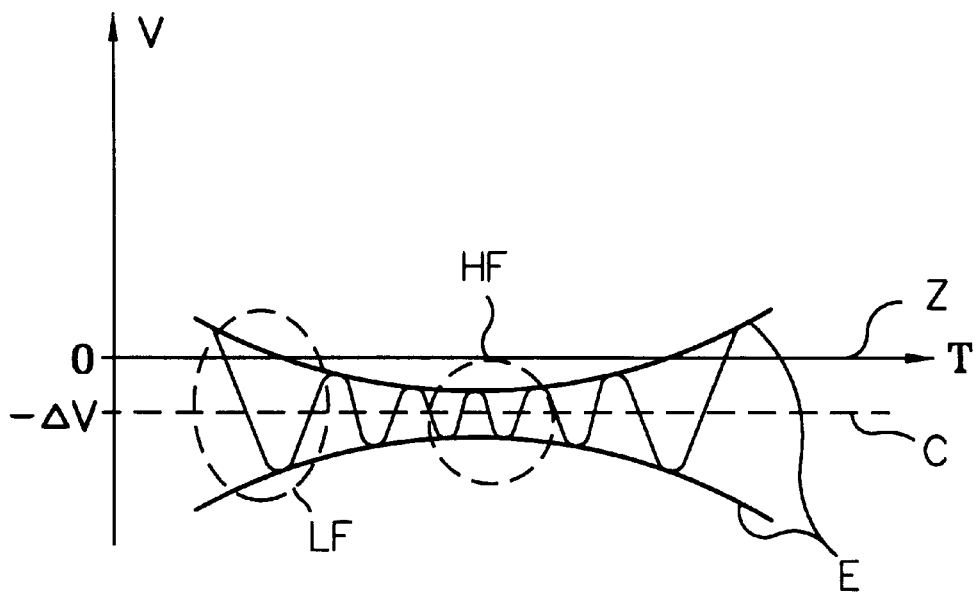
FIG. 1 is a graphical state diagram showing a phenomenon where a tracking error signal obtained when an optical pickup device traverses tracks on a recording medium at a high speed is distorted.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
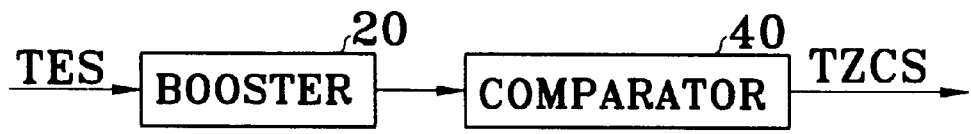
FIG. 2 is a block diagram showing a track zero cross signal generation apparatus for use in an optical disk system according to a first embodiment of the present invention.

FIG. 2 is a block diagram of a track zero cross signal generation apparatus 15 according to a first embodiment of the present invention. The track zero cross signal generation apparatus 15 includes a booster 20 for receiving a tracking error signal acquired from a recording medium, low-pass-filtering the received tracking error signal, and amplifying the low-pass-filtered tracking error signal having a predetermined high-frequency band in the pass band for low-pass-filtering. The predetermined high frequency band is within the pass band and has a range centering on the cutoff frequency of the pass band. The booster 20 includes a boosting circuit for passing only the tracking error signal having a predetermined low-frequency band, and amplifying only the low-pass-filtered tracking error signal having the predetermined high-frequency band. The pass band and the high-frequency band of the booster 20 are determined by an access time of the optical disk system. The pass band and the high frequency amplification band can be preset when the present invention is embodied, and can be variably set in correspondence with the moving speed of an optical pickup device and the rotational speed of an optical disk. The booster 20 outputs a noise-removed and amplified tracking error signal to a comparator 40. The comparator 40 compares the input tracking error signal with predetermined reference voltage levels. In more detail, the comparator 40 generates a track zero cross signal TZCS having different pulse levels when the voltage level of a tracking error signal is larger than a predetermined first reference voltage level or when a tracking error signal is smaller than a predetermined second reference voltage level. Thus, the TZCS signal has a high pulse level when the voltage level of the tracking error signal is larger than a predetermined first voltage level and a low pulse level when the tracking error signal is smaller than the predetermined second voltage level. The optical disk system counts rising edges or falling edges of the generated track zero cross signal and calculates the number of the traversed tracks.

Figure 3:
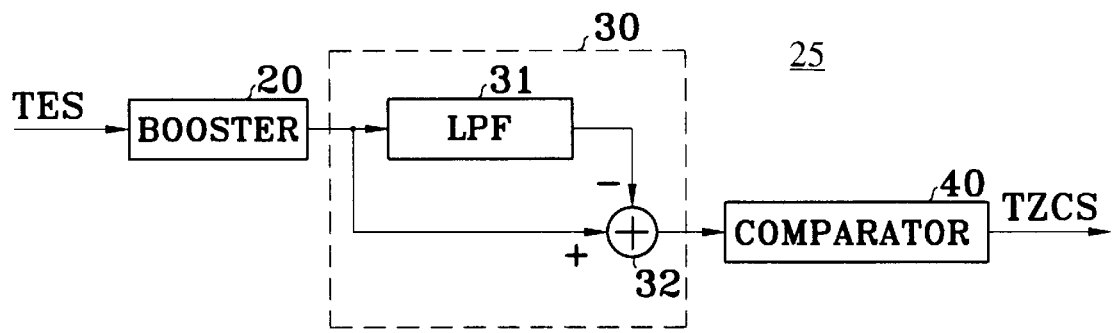
FIG. 3 is a block diagram showing respective components of a track zero cross signal generation apparatus for use in an optical disk system according to a second embodiment of the present invention wherein a center level corrector is added to the track zero cross signal generation apparatus shown in FIG. 2.

FIG. 3 is a block diagram of a track zero cross signal generation apparatus 25 according to a second embodiment of the present invention and includes a booster 20 having the same function as that of FIG. 2. A tracking error signal which is low-pass-filtered by the booster 20 and for which an envelop in a predetermined high frequency band is amplified, is input to a center level corrector 30. The center level corrector 30 corrects the center level of the input tracking error signal into a zero level involved with predetermined reference voltage levels of a comparator 40, to then output the corrected result to the comparator 40. A low-pass filter 31 in the center level corrector 30 obtains the center level of the signal supplied from the booster 20. The obtained center level has the level of −ΔAV as shown in FIG. 1. The low-pass filter 31 outputs the obtained center level to a subtracter 32. The subtracter 32 in the center level corrector 30 subtracts the output of the low-pass filter 31 from the output of the booster 20. As a result, the center level of the tracking error signal is adjusted into the zero level of the comparator 40. The subtracter 32 outputs the tracking error signal whose center level has been adjusted into the zero level to the comparator 40. The comparator 40 which receives the output of the comparator 32 performs the comparison operation as described with reference to FIG. 2, to generate a track zero cross signal. Thus, the track zero cross signal generation apparatus 25 shown in FIG. 3 provides an effect of generating a more accurate track zero cross signal than that of the apparatus shown in FIG. 2 since the apparatus shown in FIG. 3 further includes the center level corrector 30.

Figure 4:
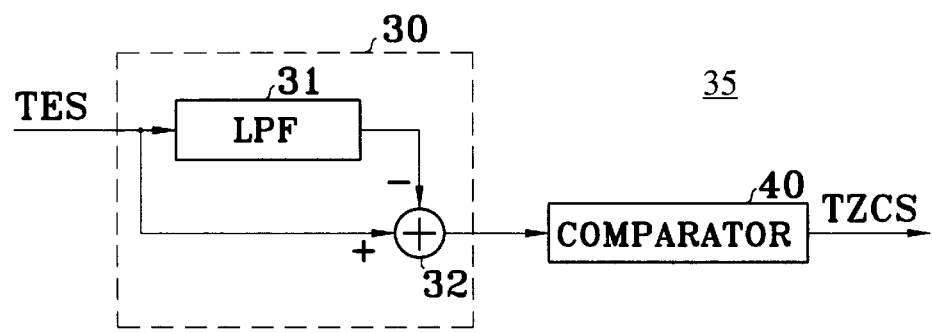
FIG. 4 is a block diagram showing respective components of a track zero cross signal generation apparatus for use in an optical disk system according to a third embodiment of the present invention.

FIG. 4 shows a block diagram of a track zero cross signal generation apparatus 35 according to a third embodiment of the present invention. The track zero cross signal generation apparatus 35 includes a center level corrector 30 for receiving the tracking error signal acquired from a recording medium and correcting the center level of the input tracking error signal into the zero level involved with predetermined reference voltage levels of a comparator 40, to thereby output the corrected result. The center level corrector 30 which receives the tracking error signal has the same configuration and function as those described with reference to FIG. 3. The subtracter 32 in the center level corrector 30 outputs the tracking error signal whose center level has been adjusted into the zero level to the comparator 40. The comparator 40 performs the same function as that described in the track zero cross signal generation apparatus shown in FIG. 2 to generate a track zero cross signal.

Figure 5:
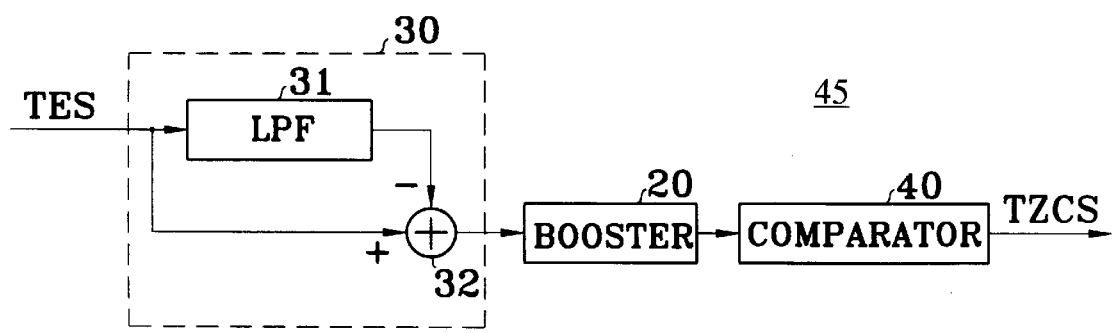
FIG. 5 is a block diagram showing respective components of a track zero cross signal generation apparatus for use in an optical disk system according to a fourth embodiment of the present invention, wherein a booster is added to the track zero cross signal generation apparatus shown in FIG. 4.

FIG. 5 shows a block diagram of a track zero cross signal generation apparatus 45 according to a fourth embodiment of the present invention, includes a center level corrector 30 having the same configuration and function as those described with reference to FIG. 4. The subtracter 32 in the center level corrector 30 outputs the tracking error signal whose center level has been adjusted into the zero level to a booster 20. The booster 20 receives the output signal of the center level corrector 30, low-pass-filters the input signal, and amplifies the low-pass-filtered input signal having a predetermined high frequency band in a pass band. The configuration and operation of the booster 20 are the same as these of FIG. 2. The booster 20 outputs the signal whose noise has been removed and for which an envelop in a predetermined high frequency band among the passed signal has been amplified, to a comparator 40. The comparator 40 which receives the output of the booster 20 performs the same function as that described with reference to FIG. 2, to generate a track zero cross signal. Thus, the track zero cross signal generation apparatus 45 shown in FIG. 5 provides an effect of generating a more accurate track zero cross signal than that of the track zero cross signal generation apparatus 35 since the track zero cross signal generation apparatus 45 shown in FIG. 5 further includes the booster 20.

Figure 6:
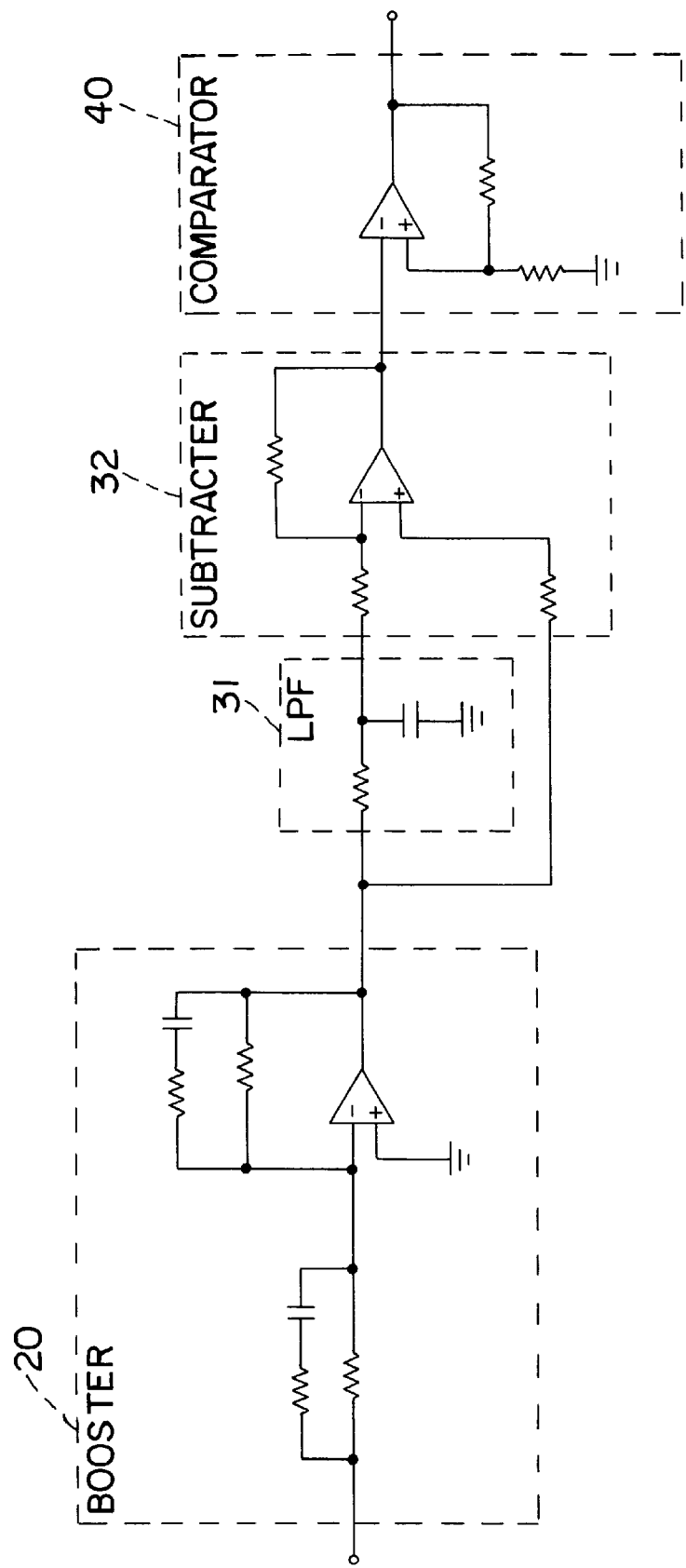
FIG. 6 shows a circuit diagram for a booster, LPF, subtracter, and comparator according to the second embodiment of the present invention.

FIG. 6 shows a circuit diagram for the booster 20, LPF 31, subtracter 32, and comparator 40 according to the second embodiment of the present invention, but the elements are applicable to the other embodiments as well.

As described above, a track zero cross signal generation apparatus for use in an optical disk system according to the first through fourth embodiments of the present invention corrects the tracking error signal acquired when an optical pickup traverses tracks on a recording medium, and then generates a track zero cross signal. Thus, the apparatus according to the present invention prevents missing of the track zero cross signal in a predetermined high frequency band, to thereby enable an optical pickup to accurately and quickly gain access to a target track.

While only certain embodiments of the invention have been specifically described herein, it will be apparent that numerous modifications may be made thereto without departing from the spirit and scope of the invention.

What is claimed is:

1. A track zero cross signal generation apparatus to generate a track zero cross signal from a tracking error signal determined in response to traversing tracks on a recording medium for use in an optical disk system, the track zero cross signal generation apparatus comprising:

an adjustment unit to amplify the tracking error signal with respect to a predetermined high frequency band in a pass band; and a comparator to compare the amplified signal with predetermined reference voltage levels, to generate the tracking error signal.

2. The track zero cross signal generation apparatus as claimed in claim 1, wherein:

said adjustment unit low-pass-filters the tracking error signal prior to amplifying the tracking error signal; and said comparator compares the low-pass-filtered and amplified signal with the predetermined reference values, to generate the track zero cross signal.

3. The track zero cross signal generation apparatus as claimed in claim 2, further comprising:

a center level corrector to adjust a center level of the low-pass-filtered and amplified signal into a zero level related to the predetermined reference values, to generate an adjusted signal;

wherein said comparator compares the adjusted signal output from said center level corrector with the predetermined reference values, to generate the tracking error signal.

4. The track zero cross signal generation apparatus as claimed in claim 3, wherein said center level corrector comprises:

a low-pass-filter to low-pass-filter the low-pass-filtered and amplified signal, to determine the center level; and a logic unit to determine a difference between the center level and tracking error signal, to generate the adjusted signal.

5. A track zero cross signal generation apparatus for generating a track zero cross signal from a tracking error signal acquired when traversing tracks on a recording medium for use in an optical disk system, the track zero cross signal generation apparatus comprising:

boosting means for receiving the tracking error signal, low-pass-filtering the received tracking error signal, and amplifying the low-pass-filtered received tracking error signal having a predetermined high frequency band in a pass band for low-pass-filtering; and a comparator to receive the output of the boosting means, comparing the received signal with predetermined reference voltage levels, and generating the track zero cross signal based on the comparison result.

6. The track zero cross signal generation apparatus according to claim 5, further comprising center level correction means for correcting the center level of the signal output from said boosting means into a zero level involved with the predetermined reference voltage levels and outputting the corrected result to the comparator.

7. The track zero cross signal generation apparatus according to claim 6, wherein said center level correction means comprises:

a low-pass filter which receives the signal output from said boosting means to obtain the center level; and a subtracter for subtracting the output of said low-pass filter from the output of said boosting means and outputting the subtraction result to said comparator.

8. The track zero cross signal generation apparatus according to claim 5, wherein the pass band and predetermined high frequency band in said boosting means are determined by an access time of the optical disk system.

9. The track zero cross signal generation apparatus according to claim 5, wherein said comparator generates the track zero cross signal which has different pulse levels when a voltage level of the signal received from boosting means is larger than a first one of the predetermined reference voltage levels or when the voltage level of the received signal is smaller than a second one of the predetermined reference voltage levels.

\* \* \* \* \*